US008184595B2

(12) United States Patent
Shuai

(10) Patent No.: US 8,184,595 B2
(45) Date of Patent: May 22, 2012

(54) METHOD, APPARATUS AND SYSTEM FOR OBTAINING LOCATION AREA INFORMATION DURING HANDOVER BETWEEN HETEROGENEOUS NETWORKS

(75) Inventor: Yanglai Shuai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/294,008

(22) Filed: Nov. 10, 2011

(65) Prior Publication Data
US 2012/0052865 A1 Mar. 1, 2012

Related U.S. Application Data

(63) Continuation of application No. 12/767,377, filed on Apr. 26, 2010, which is a continuation of application No. PCT/CN2009/073102, filed on Aug. 5, 2009.

(30) Foreign Application Priority Data

Aug. 15, 2008 (CN) .......................... 2008 1 0142461

(51) Int. Cl.
H04W 36/10 (2009.01)
H04W 36/32 (2009.01)
H04W 24/00 (2009.01)
(52) U.S. Cl. ..... 370/331; 455/438; 455/440; 455/456.2; 455/456.3; 455/456.5
(58) Field of Classification Search ................... 370/331; 455/432.1, 436, 437, 438, 439, 440, 443, 455/444, 456.2, 456.3, 456.5, 456.6
See application file for complete search history.

(56) References Cited

U.S. PATENT DOCUMENTS

| 2003/0118015 | A1 | 6/2003 | Gunnarsson | |
|---|---|---|---|---|
| 2007/0026866 | A1 | 2/2007 | Krishnamurthi et al. | |
| 2008/0025263 | A1* | 1/2008 | Pelkonen | 370/332 |
| 2008/0031159 | A1* | 2/2008 | Jokinen | 370/255 |
| 2008/0181178 | A1* | 7/2008 | Shaheen | 370/331 |
| 2008/0192697 | A1* | 8/2008 | Shaheen | 370/331 |
| 2008/0259873 | A1* | 10/2008 | Ahmavaara et al. | 370/331 |
| 2008/0320149 | A1* | 12/2008 | Faccin | 709/228 |
| 2009/0042576 | A1* | 2/2009 | Mukherjee et al. | 455/436 |
| 2009/0059829 | A1* | 3/2009 | Bachmann et al. | 370/311 |
| 2009/0073933 | A1* | 3/2009 | Madour et al. | 370/331 |
| 2009/0109922 | A1* | 4/2009 | Livanos | 370/331 |

(Continued)

FOREIGN PATENT DOCUMENTS

CN    101047947 A    10/2007

(Continued)

OTHER PUBLICATIONS

International search report for International application No. PCT/CN2009/073102, dated Oct. 15, 2009, total 4 pages.

(Continued)

Primary Examiner — Chi Pham
Assistant Examiner — Ahmed Elallam

(57) ABSTRACT

A method obtains area information during handover between heterogeneous networks. A mobility management entity of a destination network receives location area related information of a User Equipment (UE) from a mobility management entity of a source network. The mobility management entity obtains location area information required by the UE according to the location area related information. The mobility management entity sends the location area information required by the UE to the UE.

10 Claims, 4 Drawing Sheets

U.S. PATENT DOCUMENTS

| | | | |
|---|---|---|---|
| 2009/0129342 A1* | 5/2009 | Hwang et al. ............... | 370/331 |
| 2009/0176513 A1* | 7/2009 | Bosch et al. ............... | 455/458 |
| 2009/0232022 A1* | 9/2009 | Savolainen et al. ........ | 370/254 |
| 2009/0238207 A1* | 9/2009 | Zhao et al. ............... | 370/468 |
| 2009/0316656 A1* | 12/2009 | Zhao et al. ............... | 370/331 |
| 2009/0316657 A1* | 12/2009 | Singh et al. ............... | 370/331 |
| 2011/0244865 A1* | 10/2011 | Wu et al. ............... | 455/436 |

FOREIGN PATENT DOCUMENTS

| | | |
|---|---|---|
| CN | 101179839 A | 5/2008 |
| CN | 101223811 A | 7/2008 |

OTHER PUBLICATIONS

English Translation of the Written Opinion of the International Search Authority for International application No. PCT/CN2009/073102, dated Oct. 15, 2009, total 4 pages.

Chinese office action for Chinese application No. 200810142461.7, dated Jul. 25, 2011 and the English translation thereof, total 14 pages.

3GPP TS 23.402 V8.2.0;3rd Generation Partnership Project;Technical Specification Group Services and System Aspects;Architecture enhancements for non-3GPP accesses(Release 8),dated Jun. 2008,total 181 pages.

3GPP TS 23.401 V8.2.0,3rd Generation Partnership Project;Technical Specification Group Services and System Aspects;General Packet Radio Service (GPRS) enhancements for Evolved Universal Terrestrial Radio Access Network(E-UTRAN) access(Release 8),dated Jun. 2008,total 182 pages.

3GPP TS 29.276 V1.1.0,3rd Generation Partnership Project;Technical Specification Group Core Network and Terminals;3GPP Evolved Packet System;Optimized Handover Procedures and Protocols between EUTRAN Access and cdma2000 HRPD Access-Stage 3 (Release 8),dated Jun. 2008,total 21 pages.

Ericsson et al :"S101 Sector ID",3GPP Draft;S2-086596-CR23402 S101 Sector ID PA4,3rd Generation Partnership Project(3GPP),Mobile Competence Center;dated Oct. 13-17, 2008,total 5 pages.

European Search Report for European Patent Application No. 09806350.6,date Sep. 21, 2011,total 11 pages.

3GPP TR 23.882 V1.15.0;3rd Generation Partnership Project-;Technical Specification Group Services and System Aspects;3GPP System Architecture Evolution:Report on Technical Options and Conclusions(Release 7),dated Feb. 2008,total 262 pages.

3GPP TS 23.234 V7.6.0,3rd Generation Partnership Project;Technical Specification Group Services and System Aspects;3GPP system to Wireless Local Area Network (WLAN) interworking;System description(Release 7),dated Dec. 2007,total 85 pages.

Qualcomm Europe:"Pseudo-CR on HA assignment via PCO",3GPP TSG CT WG1 Meeting #52,C1-081145, Jeju Island, Korea, Apr. 7-11, 2008,total 2 pages.

Pre-Interview Communication of corresponding U.S. Appl. No. 12/767,377, mailed on Dec. 21, 2011, 7 pages total.

* cited by examiner

METHOD, APPARATUS AND SYSTEM FOR OBTAINING LOCATION AREA INFORMATION DURING HANDOVER BETWEEN HETEROGENEOUS NETWORKS

This application is a continuation of U.S. patent application Ser. No. 12/767,377, filed on Apr. 26, 2010, which is a continuation of International Application No. PCT/CN2009/073102, filed on Aug. 5, 2009. The International Application claims priority to Chinese Application No. 200810142461.7 filed on Aug. 15, 2008, the afore-mentioned patent applications are hereby incorporated by reference in their entireties.

TECHNICAL FIELD

The present invention relates to mobile communication technologies, and in particular, to a method, an apparatus and a system for obtaining location area information during handover between heterogeneous networks.

BACKGROUND

In traditional radio communication networks, because of limited frequency resources and adverse transmission environments, an access network is unable to provide high access rates. With the development of broadband radio technologies, broadband radio access networks emerge, which offsets the weakness of a traditional radio network. A broadband radio access network supports high-speed access and improves the access capability of radio communications to a large extent.

With the high-speed access, the application of broadband radio access networks also comes with the issue of mobile handover between different access networks.

When a User Equipment (UE) moves between heterogeneous networks, for example, during the handover of a UE between a 3GPP network and a non-SGPP network, the destination network is unable to know the location area of the UE. As a result, the UE may fail to be handed over to the destination network, or after the UE moves to the destination network, the destination network cannot manage the UE, for example, maintaining its status.

SUMMARY OF THE INVENTION

Embodiments of the present invention provide a method for obtaining location area information during handover between heterogeneous networks.

Embodiments of the present invention also provide an apparatus and a system for obtaining location area information during handover between heterogeneous networks.

Following technical solutions are provided.

A method obtains area information during handover between heterogeneous networks. A mobility management entity of a destination network receives location area related information of a User Equipment (UE) from a mobility management entity of a source network. The mobility management entity obtains location area information required by the UE according to the location area related information. The mobility management entity sends the location area information required by the UE to the UE.

A mobility management entity is provided, which includes a processing module and a transceiving module.

The processing module is configured to obtain location area information of a User Equipment (UE) in a destination network.

The transceiving module is configured to send the location area information of the UE in the destination network to a mobility management entity of the destination network and receive location area information required by the UE according to the location area information of the UE in the destination network from the mobility management of the destination network.

Another mobility management entity is provided, which includes a processing module and a transceiving module.

The processing module is configured to receive location area related information of a User Equipment (UE) and obtain location area information required by the UE according to the location area related information.

The transceiving module is configured to send the location area information required by the UE to the UE.

A system for obtaining location area information during handover between heterogeneous networks includes a UE, a mobility management entity of a source network and a mobility management entity of a destination network.

The mobility management entity of the destination network is configured to receive location area related information of the UE sent by the mobility management entity of the source network; obtain location area information required by the UE according to the location area related information after confirming that the location area related information of the UE is received; and send the location area information required by the UE to the UE.

Another system for obtaining location area information during handover between heterogeneous networks includes a UE, a mobility management entity of a source network and a mobility management entity of a destination network.

The mobility management entity of the source network is configured to obtain location area related information of the UE and send the location area related information of the UE to the mobility management entity of the destination network.

Another method obtains location area information during handover between heterogeneous networks. A mobility management entity of a destination network receives an Attach Request message from a UE via a mobility management entity of a source network. After confirming that no location area information is received, the mobility management entity, constructs an Attach Accept message according to the Attach Request message, and sends the Attach Accept message to the UE via the mobility management entity of the source network. The Attach Accept message does not carry location area information required by the UE. The mobility management entity receives an Attach Complete message from the UE via the mobility management entity of the source network and hands a radio link of the UE over to the destination network according to the Attach Complete message. After completing handover of the radio link of the UE to the destination network, the mobility management entity of the destination network, obtains location area information of the UE in a location update procedure initiated by the UE.

A UE includes a transceiving module and a processing module.

The module is configured to receive an Attach Accept message sent by a mobility management entity of a destination network and to send an Attach Request message and an Attach Complete message to the mobility management entity of the destination network.

The processing module is configured to construct the Attach Request message according to a handover decision, to construct the Attach Complete message according to the Attach Accept message when confirming that location area information required by the UE is not received and send the Attach Complete message via the transceiving module, and to initiate a location update procedure after a radio link of the UE is handed over to the destination network.

Another system for obtaining location area information during handover between heterogeneous networks includes a mobility management entity of a destination network, a mobility management entity of a source network and a UE.

The mobility management entity of the destination network is configured to receive an Attach Request message sent by the UE via the mobility management entity of the source network, to construct an Attach Accept message according to the Attach Request message when confirming that location area information of the UE is not received and send the Attach Accept message to the UE via the mobility management entity of the source network, where the Attach Accept message does not carry location area information required by the UE, to receive an Attach Complete message sent by the UE via the mobility management entity of the source network, to hand a radio link of the UE over to the destination network according to the Attach Complete message, and to obtain location area information of the UE in a location update procedure initiated by the UE.

Another system for obtaining location area information during handover between heterogeneous networks includes a mobility management entity of a destination network, a mobility management entity of a source network and a UE.

The UE is configured to construct an Attach Request message according to a handover decision, to send the Attach Request message to the mobility management entity of the destination network via the mobility management entity of the source network, to receive an Attach Accept message from the mobility management entity of the destination network via the mobility management entity of the source network, to construct an Attach Complete message according to the Attach Accept message when confirming that location area information of the UE in the destination network is not received, to send the Attach Complete message to the mobility management entity of the destination network via the mobility management entity of the source network, and to initiate a location update procedure.

Embodiments of the present invention provide a method, an apparatus and a system for obtaining location area information during handover between heterogeneous networks. In the embodiments, during handover, the mobility management entity of the source network determines the location area related information of the UE in the destination network and sends the information to the mobility management entity of the destination network so that the mobility management entity of the destination network can obtain the location area information of the UE in the destination network according to the location area related information and therefore know the area where the UE is located. Therefore, the UE can complete handover successfully and the destination network can normally maintain the status of the UE. Furthermore, according to the location area information sent by the mobility management entity of the destination network, the UE can perform periodical location update normally, which helps the destination network maintain the status of the UE. In addition, another method, apparatus and system for obtaining location area information during handover between heterogeneous networks are provided in embodiments of the present invention. In such embodiments, the mobility management entity of the destination network and the UE can complete a successful handover procedure without location area information and a location update procedure is initiated after the radio link of the UE is handed over to the destination network so that the destination network knows the location area of the UE and that the UE knows its location area information. Thus smooth handover is implemented, and the destination network is enabled to normally maintain the status of the UE.

DETAILED DESCRIPTION OF ILLUSTRATIVE EMBODIMENTS

To better explain the objective, technical solution and advantages of the present invention, the embodiments of the present invention are described in detail with reference to the accompanying drawings.

Several embodiments are provided and are detailed in the following sections. It should be noted that the Mobility Management Entity (MME) mentioned in the embodiments of the present invention is only an example of mobility management entities in 3GPP networks. Alternatively, it may be other mobility management entities in 3GPP networks, such as a Serving GPRS Support Node (SGSN).

The High Rate Packet Data Access Node (HRPD AN) is only an example of mobility management entities in non-3GPP networks. It may other be mobility management entities in non-3GPP networks, such as an Access Service Network Gateway (ASN GW) in a Worldwide Interoperability for Microwave Access (WiMAX) system and an Evolved Packet Data Gateway (ePDG) in an Industrial Wireless Local Area Network (IWLAN).

The Tracking Area Identity (TAI) is only an example of the location area information of a UE. It may be other UE location area indicators, such as a Tracking Area Code (TAC) and a Routing Area Identity (RAI). Likewise, the Tracking Area Update (TAU) procedure is also an exemplary UE location update procedure. It may be other procedures that can implement update of the UE location area.

Location area related information includes information related to the location area, such as information that can be referenced to determine the location area information, like a cell identifier (ID) of a cell in a source network (hereafter, referred as source cell ID.)

The Periodic TA Update Timer is only an exemplary periodic UE location update timer and may also be other timers that can implement an update of the UE location area.

Figure 5:
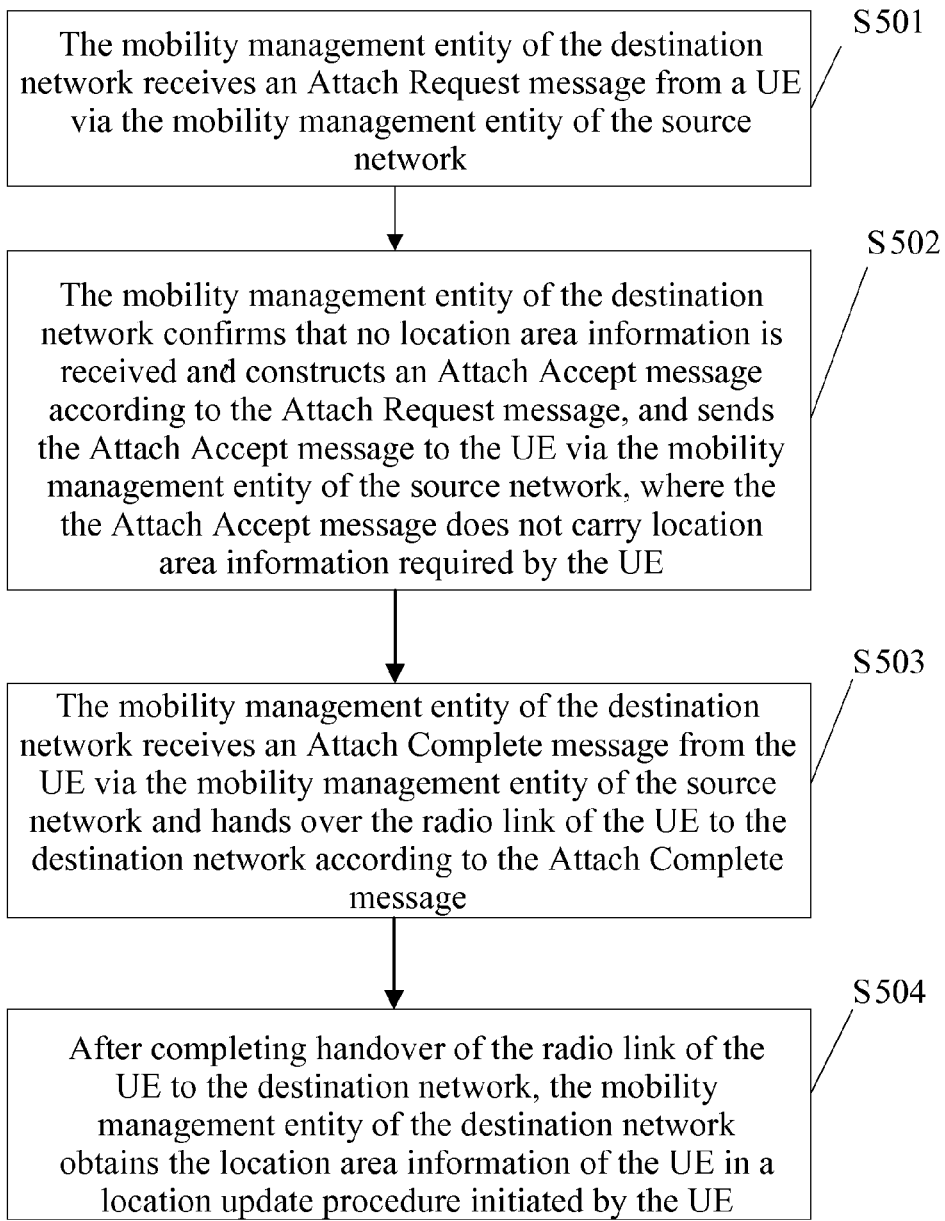
FIG. 5 is a flowchart of another method for obtaining location area information during handover between heterogeneous networks in an embodiment of the present invention.

A method for obtaining location area information during handover between heterogeneous networks according to an embodiment of the present invention is described with reference to FIG. 5. The method includes.

S501: The mobility management entity of a destination network receives an Attach Request message from a UE via the mobility management entity of a source network.

S502: When confirming that no location area information is received, the mobility management entity of the destination network constructs an Attach Accept message according to the Attach Request message, and sends the Attach Accept message to the UE via the mobility management entity of the source network, where the Attach Accept message does not carry location area information required by the UE. The mobility management entity of the destination network may start a timer when sending the Attach Accept message and initiate a detach procedure with respect to the UE after it determines that the UE does not access the destination network within a specified time.

S503: The mobility management entity of the destination network receives an Attach Complete message from the UE via the mobility management entity of the source network and completes handover of the radio link of the UE to the destination network according to the Attach Complete message.

S504: After completing handover of the radio link of the UE to the destination network, the mobility management entity of the destination network obtains the location area information of the UE in a location update procedure initiated by the UE.

In this embodiment, the mobility management entity of the destination network and the UE can complete a successful handover procedure without location area information and a location update procedure is initiated after the radio link of the UE is handed over to the destination network so that the destination network knows the location area of the UE and that the UE knows its location area information. Thus, smooth handover is implemented, and the destination network is enabled to normally maintain the status of the UE.

Figure 1:
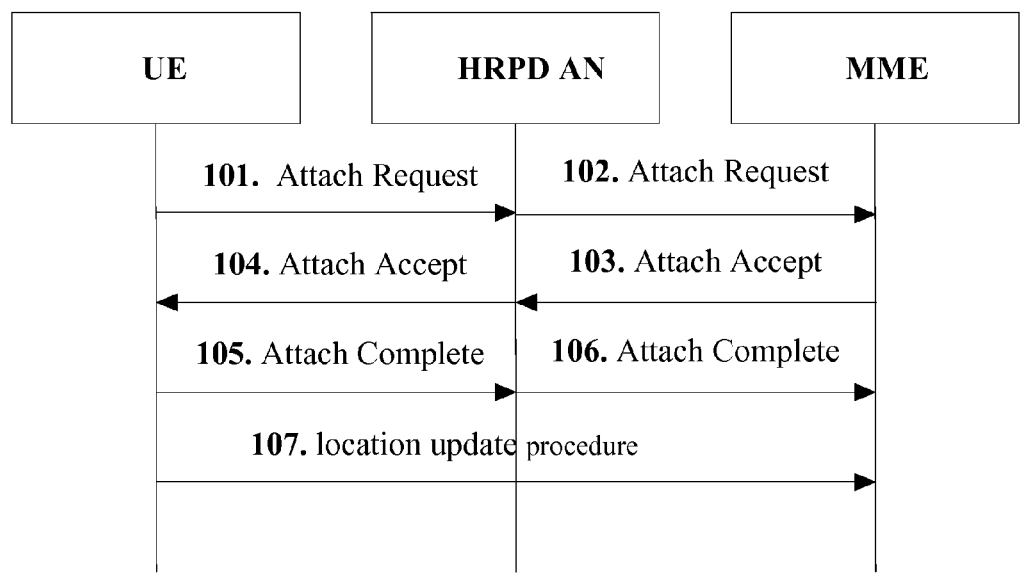
FIG. 1 is a flowchart of a first method for obtaining location area information during handover between heterogeneous networks in an embodiment of the present invention.

To resolve the issue that the destination network is unable to know the location area information of a UE when the UE is handed over between radio access networks, an embodiment of the present invention provides a method for obtaining location area information of a UE as shown in FIG. 1.

The UE accesses a non-3GPP network and works in the non-3GPP network, for example, accesses certain services. When the UE hands over from the non-3GPP network to a 3GPP network, the method for obtaining location area information shown in FIG. 1 can be adopted. In the method shown in FIG. 1, the HRPD AN is a mobility management entity in the non-3GPP network and the MME is a mobility management entity in the 3GPP network; and the non-3GPP network is a source network and the 3GPP is a destination network. The method includes.

S101: The UE sends an Attach Request message to the HRPD AN, requesting accessing the destination network.

Upon reception of a handover notification from the HRPD AN, the UE constructs an Attach Request message according to the handover decision and sends an air interface message to the HRPD AN. The air interface message carries the Attach Request message for requesting accessing the destination network.

The handover decision may be made by the HRPD AN or the UE. For example, the HRPD AN determines that the UE needs network handover according to data reported by the UE and local policies and decides to initiate a handover procedure from the source network to the destination network and instructs the UE to initiate a handover request. For example, the UE decides to initiate a handover procedure from the source network to the destination network according to information collected by the UE. The collected information includes signal intensity of the local cell and the adjacent cell and interference information.

S102: The HRPD AN forwards the Attach Request message of the UE to the MME.

The HRPD AN may encapsulate the received Attach Request message of the UE in a Direct Transfer message and forward it to the MME. The forwarding mode may be, for example, transparent transmission. The following descriptions are all based on transparent transmission. The HRPD AN may also encapsulate other messages in the Direct Transfer message, such as the current communication interface ID of the UE and UE capabilities. The current communication interface ID of the UE and UE capability information indicate the communication interface between the current MME of the UE and the HRPD AN and capabilities of the UE to the MME.

S103: The MME sends an Attach Accept message to the HRPD AN.

Upon reception of the Direct Transfer message from the HRPD AN, the MME parses the Direct Transfer message. After determining that the Direct Transfer message does not carry a TAI, the MME constructs an Attach Accept message according to the Attach Request message carried in the Direct Transfer message and sends the Attach Accept message to the HRPD AN to get ready to accept access of the UE to the destination network. The Attach Accept message does not carry a TAI list. Normally, if no TAI is received, the Attach Accept message does not carry a Periodic TA Update Timer and this is not further described in the following embodiments. The MME may also encapsulate other messages in the Direct Transfer message, such as the communication interface ID and a bearer setup request. The communication interface ID and the bearer setup request indicate the communication interface used by the MME and the MME's readiness to set up a bearer to the HRPD AN.

S104: The HRPD AN transmits the Attach Accept message to the UE transparently.

The HRPD AN encapsulates the Attach Accept message in an air interface message and sends it to the UE so as to complete the transparent transmission of the Attach Accept message. In addition to the Attach Accept message, the HRPD AN may encapsulate the bearer setup request in the air interface message to complete the transparent transmission of the bearer setup request.

S105: The UE sends an Attach Complete message to the HRPD AN.

The UE confirms that the air interface message does not carry a TAI list according to the received air interface message and constructs an Attach Complete message according to the Attach Accept message carried in the air interface message. The UE encapsulates the Attach Complete message in an air interface message and sends it to the HRPD AN. The air interface message may also carry a bearer setup response for final setup of a bearer.

S106: The HRPD AN transmits the Attach Complete message transparently.

Upon reception of the Attach Complete message from the UE, the HRPD AN encapsulates the message in a Direct Transfer message and sends it to the MME to complete the transparent transmission of the Attach Complete message. The HRPD AN may also encapsulate the current communication interface ID of the UE and the bearer setup response in the Direct Transfer message. The current communication interface ID of the UE and the bearer setup response are used to notify the UE of the current S101 interface used by the UE and completion of the bearer setup. Upon reception of the Attach Complete message, the MME hands over the radio link of the UE to the destination network through general operations like information exchange with the core network according to the Attach Complete message.

S107: The UE initiates a location update procedure.

After the radio link of the UE is handed over to the destination network, a network connection is established between the UE and the destination network and the UE may initiate a location update procedure. Through the location update procedure, the UE reports its TAI and the MME knows the current TAI of the UE accordingly. The MME sends a TAI list to the UE according to the TAI and may also send other parameters like Periodic TA Update Timer to the UE. In the following embodiments, the Periodic TA Update Timer may be sent simultaneously with the TAI list, or the Periodic TA Update Timer is obtained together with the TAI list. This is not further described in the following embodiments.

By obtaining the TAI of the UE, the MME is able to maintain the status of the UE after the UE is handed over to the destination network and the UE can also update its location area information and maintain its status according to the obtained location area information and the timer information.

After the UE accesses the destination network successfully, the HRPD AN can release the resource used by the UE in the source network for use of another UE that accesses the source network.

In addition, in S104, when the MME sends the Attach Accept message, the MME may also start a timer. If the timer expires, which means the radio link of the UE is not handed over to the destination network within a specified time, the MME initiates a detach procedure with respect to the UE. With the detach procedure, the MME may clear information of the UE in the destination network and release the resource allocated for the UE so as to optimize network performance and reduce redundancy.

In the above embodiment, when the MME confirms that the Attach Request message does not carry a TAI of the UE, the MME can normally complete the subsequent handover procedure and send an Attach Accept message which does not carry a TAI list or Periodic TA Update Timer. When the UE determines that the received Attach Accept message does not carry a TAI list, the UE can still complete the subsequent handover normally and send an Attach Complete message. Therefore, the handover procedure is completed successfully. In addition, after the radio link of the UE is handed over to the destination network, the UE initiates a location update procedure. Through the location update procedure, the MME knows the TAI of the UE and the UE obtains the TAI list and Periodic TA Update Timer of the destination network so that the destination network is aware of the location and status of the UE and the UE can update its location and status periodically. Thus, the network can maintain the status and location of the UE normally. Therefore, the UE can be handed over successfully to the destination network.

Figure 2:
FIG. 2 shows a structure of an apparatus for obtaining location area information during handover between heterogeneous networks in an embodiment of the present invention.

The MME in the above embodiment is shown in FIG. 2 and includes a processing module and a transceiving module. The transceiving module is configured to receive information sent by another apparatus and to send information to another apparatus, including receiving the Attach Request message and Attach Complete message sent by the UE via the HRPD AN and sending the Attach Accept message to the UE via the HRPD AN.

The processing module is configured to confirm that no TAI of the UE is received after the transceiving module receives the Attach Request message, to construct an Attach Accept message according to the Attach Request message and send the Attach Accept message via the transceiving module, to complete handover according to the Attach Complete message, to obtain the TAI of the UE in the location update procedure initiated by the UE and construct a TAI list and a Periodic TA Update Timer according to the TAI, and to send the parameters to the UE via the transceiving module.

In addition, the processing module is configured to start a timer when sending the Attach Accept message to the UE via the transceiving module and initiate a detach procedure with respect to the UE if the UE does not access the destination network within a specified time.

The UE in the above embodiment is shown in FIG. 2 and includes a processing module and a transceiving module. The transceiving module is configured to receive information sent by another apparatus and send information to another apparatus, including receiving the Attach Accept message sent by the MME via the HRPD AN and sending the Attach Request message and Attach Complete message to the MME via the HRPD AN.

The processing module is configured to construct an Attach Request message according to a handover decision made by the HRPD AN or made by the UE and send the Attach Request message via the transceiving module; confirm that no TAI list is received after the transceiving module receives the Attach Accept message and construct an Attach Complete message according to the Attach Accept message and send the Attach Complete message via the transceiving module; and initiate a location update procedure after the MME completes handover of the radio link of the UE to the destination network.

The processing module may construct the Attach Request message according to the handover decision made by the HRPD AN in this way. When the HRPD AN determines that the UE needs network handover according to data reported by the UE and local policies, the HRPD AN decides to initiate a handover procedure from the source network to the destination network, and instructs the UE to initiate a handover request; and the UE constructs the Attach Request message according to the handover decision. In addition, the processing module is configured to send the Attach Request message to the HRPD AN via the module according to the handover notification from the HRPD AN. The Attach Request message is forwarded by the HRPD AN to the MME. For example, the HRPD AN decides to initiate a handover procedure from the source network to the destination network according to information collected by the UE. The collected information includes signal intensity of the local cell and the adjacent cell and interference information.

The processing module may construct the Attach Request message according to a handover decision made by the UE in this way. The processing module decides to initiate a handover procedure according to the collected information such as signal intensity and interference and constructs the Attach Request message according to the decision.

Figure 3:
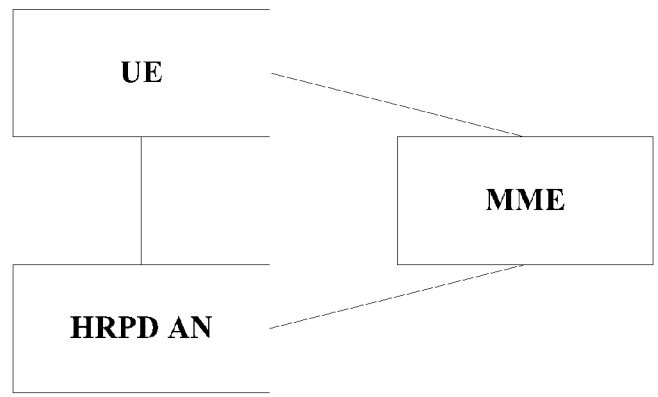
FIG. 3 shows a system for obtaining location area information during handover between heterogeneous networks in an embodiment of the present invention.

The system in the above embodiment is shown in FIG. 3 and includes at least a UE, an MME, and an HRPD AN.

The UE is configured to construct an Attach Request message according to a handover decision and send the Attach Request message to the MME, to receive an Attach Accept message from the MME, to construct an Attach Complete message according to the Attach Accept message and send the Attach Complete message to the MME when confirming that no TAI list or Periodic TA Update Timer is received, and to initiate a location update procedure after its radio link is handed over to the destination network.

The UE is further configured to make a handover decision according to collected information.

The MME is configured to receive the Attach Request message from the UE, to construct an Attach Accept message according to the Attach Request message when confirming that the TAI is not received and send the Attach Accept message to the UE, where the Attach Accept message does not carry a TAI list, to receive the Attach Complete message from the UE and perform general operations like information exchange with the core network according to the Attach Complete message to hand over the radio link of the UE to the destination network.

The HRPD AN is configured to transmit messages transparently between the MME and the UE, including forwarding the Attach Request message and Attach Complete message of the UE to the MME and forwarding the Attach Accept message of the MME to the UE.

The HRPD AN is further configured to make a handover decision according to information reported by the UE and local policies and instruct the UE to initiate a handover procedure.

As described above, the UE in the system may further include a processing module and a transceiving module, the specific implementation of which is the same as the above embodiment of the UE and thus not described here.

As described above, the MME in the system may further include a processing module and a transceiving module, the specific implementation of which is the same as the above embodiment of the MME and thus not described here.

Figure 6:
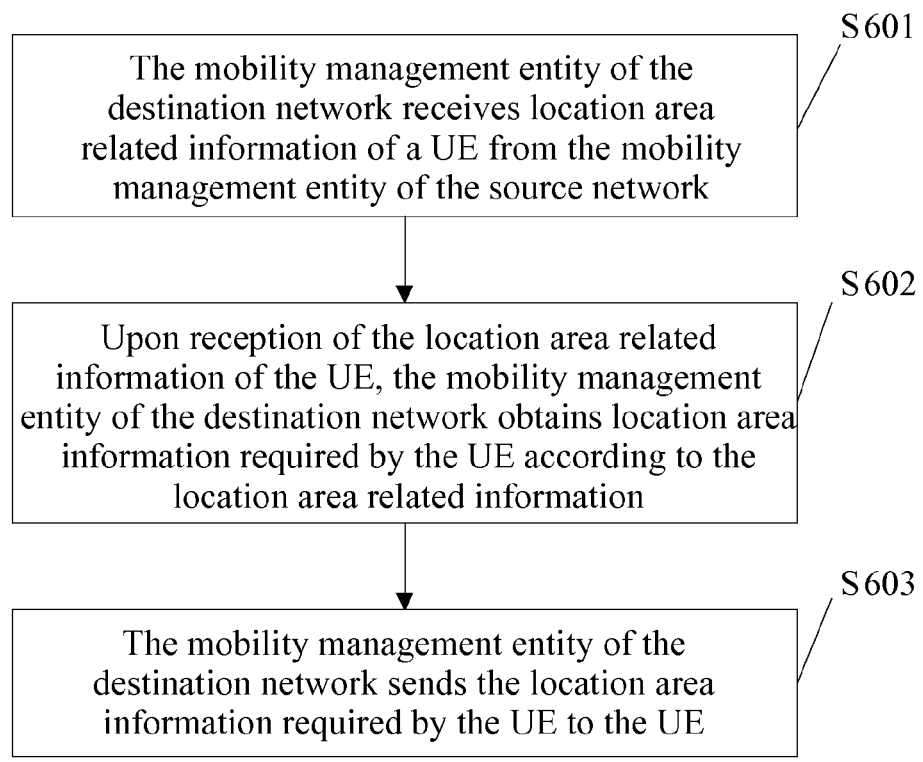
FIG. 6 is a flowchart of still another method for obtaining location area information during handover between heterogeneous networks in an embodiment of the present invention.

A method for obtaining location area information during handover between heterogeneous networks according to an embodiment of the present invention is described with reference to FIG. 6. The method includes.

S601: The mobility management entity of a destination network receives location area related information of a UE from a mobility management entity of a source network.

The location area related information of the UE is a source cell ID, or cell ID of a cell in the destination network (hereafter, referred to as a destination cell ID), or location area information of the UE in the destination network.

S602: Upon reception of the location area related information of the UE, the mobility management entity of the destination network obtains the location area information required by the UE according to the location area related information.

If the location area related information of the UE is the source cell ID of the UE, the mobility management entity of the destination network determines the location area information of the UE in the destination network according to the source cell ID of the UE and a mapping between cell IDs of cells in the source network and location areas in the destination network, and obtains the location area information required by the UE according to the location area information of the UE in the destination network.

If the location area related information of the UE is the destination cell ID of the UE, the destination cell ID of the UE is obtained by the mobility management entity of the source network dynamically through network selection, or obtained by the mobility management entity of the source network from the cell IDs of cells in the destination network that are statically configured in the mobility management entity of the source network; the destination cell ID of the UE is determined by the mobility management entity of the source network according to the destination cell ID of the UE and a mapping between cell IDs of cells in a destination network and location areas in the destination network, or determined by the mobility management entity of the source network according to the source cell ID of the UE and a mapping between cell IDs of cells in the source network and location areas in the source network; the mobility management entity of the destination network determines the location area information of the UE in the destination network according to the destination cell ID of the UE and a mapping between cell IDs of cells in the destination network and location areas in the destination network and obtains the location area information required by the UE according to the location area information of the UE in the destination network.

When the mobility management entity of the source network obtains the destination cell ID of the UE dynamically through network selection, the dynamic obtaining may be the UE sends a measurement report to a NodeB in the source network, which selects a cell in the destination network according to the received measurement report.

If the location area related information of the UE is the location area information of the UE in the destination network, the location area information of the UE in the destination network is determined by the mobility management entity of the source network according to the destination cell ID or the source cell ID, where the destination cell ID is obtained by the mobility management entity of the source network dynamically through network selection or from the destination cell ID that is statically configured in the mobility management entity of the source network; the mobility management entity of the destination network obtains the location area information required by the UE according to the location area information of the UE in the destination network.

S603: The mobility management entity of the destination network sends the location area information required by the UE to the UE.

In this embodiment, during a handover procedure, the mobility management entity of the source network determines the location area related information of the UE in the destination network and sends the information to the mobility management entity of the destination network so that the mobility management entity of the destination network can obtain the location area information of the UE in the destination network according to the location area related information and know clearly the location area of the UE. Therefore, the UE can complete a successful handover procedure and the destination network can normally maintain the status of the UE. Furthermore, according to the location area information sent by the mobility management entity of the destination network, the UE can perform periodical location update normally, which helps the destination network maintain the status of the UE.

Figure 4:
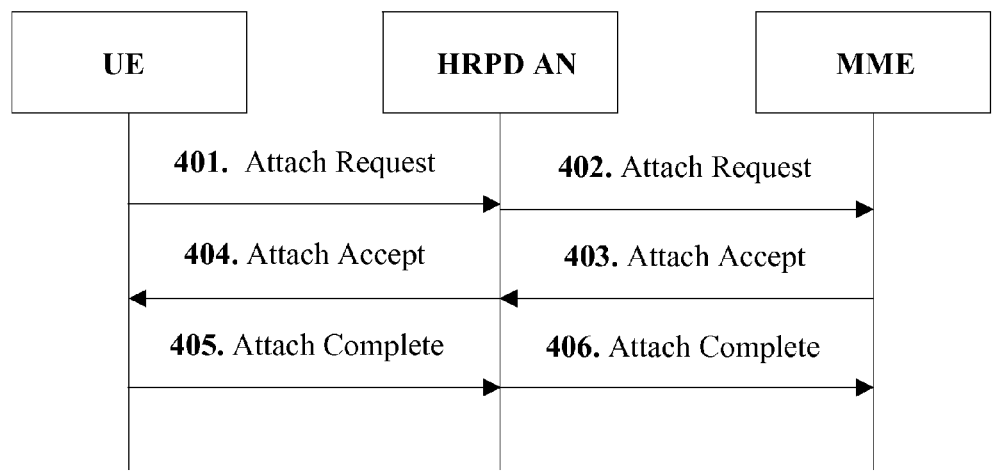
FIG. 4 is a flowchart of a second method for obtaining location area information during handover between heterogeneous networks in an embodiment of the present invention.

FIG. 4 shows another method for obtaining location area information in an embodiment of the present invention. The method includes.

S401: The UE constructs an Attach Request message according to a handover decision and sends the Attach Request message to the HRPD AN, requesting accessing the destination network.

Upon reception of a handover decision, the UE constructs an Attach Request message according to the handover decision and sends to the HRPD AN an air interface message which carries the Attach Request message for requesting accessing the destination network.

The handover decision is made by the HRPD AN according to data reported by the UE and local policies or made by the UE according to collected information.

S402: The HRPD AN transmits the received Attach Request message to the MME transparently.

The HRPD AN encapsulates the Attach Request message in a Direct Transfer message and transmits the Attach Request message to the MME transparently. Upon reception of the Attach Request message from the UE, the HRPD AN encapsulates the Attach Request message and obtained location area related information in the Direct Transfer message and sends the Direct Transfer message to the MME so that the MME knows the location area of the UE in the destination network.

In S402, the HRPD AN may obtain the location area related information in this way. The HRPD AN may obtain the destination cell ID of the UE dynamically through network selection and determine the location area information TAI of the UE in the destination network according to the mapping between cell IDs of cells in the destination network and location areas in the destination network. According to the above method, the location area related information obtained by the HRPD AN is the TAI. The MME may know the location area of the UE according to the TAI encapsulated in the Direct Transfer message. The dynamic obtaining through network selection may be obtaining according to a measurement report of the UE.

According to the method for the HRPD AN to obtain location area related information, the HRPD AN may obtain the destination cell ID of the UE from the cell IDs of cells in the destination network that are statically configured in the HRPD AN.

In S402, the HRPD AN may obtain the location area related information in this way. The HRPD AN obtains the destination cell ID of the UE dynamically through network selection or obtains the destination cell ID of the UE from the cell IDs of cells in the destination network that are statically configured in the HRPD AN. Further, the HRPD AN encapsulates the obtained cell ID in the Direct Transfer message as location area related information and sends the message to the MME.

In S402, the HRPD AN may obtain the location area related information in this way. The HRPD AN takes the source cell ID of the UE as location area related information, encapsulates the source cell ID in the Direct Transfer message and sends the message to the MME.

S403: The MME sends an Attach Accept message to the HRPD AN.

Upon reception of the Attach Request message, the MME confirms that the Direct Transfer message carries the location area related information of the UE. Afterwards, the MME constructs an Attach Accept message according to the Attach Request message and obtains the TAI list and Periodic TA Update Timer parameters that need to be sent to the UE according to the location area related information carried in the Direct Transfer message. The MME encapsulates the Attach Accept message and the parameters in the Direct Transfer message and sends the message to the HRPD AN.

In S403, the MME may confirm that the Direct Transfer message includes the location area related information of the UE by confirming that the Direct Transfer message includes the TAI, destination cell ID or source cell ID.

In S403, the MME may obtain the TAI list and Periodic TA Update Timer that need to be sent to the UE according to the location area related information by obtaining the TAI list and Periodic TA Update Timer directly according to the TAI in the Direct Transfer message.

In S403, the MME may also obtain the TAI list and Periodic TA Update Timer that need to be sent to the UE according to the location area related information by determining the TAI of the UE according to the destination cell ID in the Direct Transfer message and the mapping between cell IDs of cells in the destination network and location areas in the destination network. After obtaining the TAI, the MME obtains the TAI list and Periodic TA Update Timer according to the TAI.

In S403, the MME may also obtain the TAI list and Periodic TA Update Timer that need to be sent to the UE according to the location area related information by determining the TAI according to the source cell ID in the Direct Transfer message and the mapping between cell IDs of cells in the source network and location areas in the destination network. Likewise, after obtaining the TAI, the MME obtains the TAI list and Periodic TA Update Timer according to the TAI.

S404: The HRPD AN transmits the Attach Accept message to the UE transparently.

The HRPD AN transmits the Attach Accept message from the MME transparently to the UE via an air interface message and meanwhile sends the TAI list and Periodic TA Update Timer to the UE via the air interface message.

S405: The UE sends an Attach Complete message to the HRPD AN.

The UE constructs an Attach Complete message according to the Attach Accept message, encapsulates the Attach Complete message in an air interface message and sends the message to the HRPD AN. The UE knows its location area in the destination network and the location update period according to the received TAI list and Periodic TA Update Timer.

S406: The HRPD AN transmits the Attach Complete message transparently to the MME.

Upon reception of the Attach Complete message from the UE, the HRPD AN encapsulates the message in a Direct Transfer message and sends it to the MME to complete the transparent transmission of the Attach Complete message. The HRPD AN may also encapsulate the current communication interface ID of the UE and a bearer setup response in the Direct Transfer message to notify the MME of the current S101 interface used by the UE and the completion of bearer setup. Upon reception of the Attach Complete message, the MME hands over the radio link of the UE to the destination network through general operations like information exchange with the core network according to the Attach Complete message.

In the above embodiment, because the HRPD AN is able to determine the location area information TAI of the UE in the destination network, the HRPD AN adds the TAI to the Attach Request message from the UE and transmits the Attach Request message to the MME transparently. Therefore, the MME is aware of the location area information of the UE in the destination network and is able to construct the TAI list and Periodic TA Update Timer and send the parameters and the Attach Accept message to the UE via the Direct Transfer message. With the indication of the TAI, the destination network is aware of the location area of the UE and therefore is able to maintain the UE normally. Furthermore, with the TAI list and Periodic TA Update Timer, the UE clearly knows its location area in the destination network and the location update period so as to perform normal location update. Thus, the UE can be handed over successfully to the destination network.

The HRPD AN in the above embodiment is shown in FIG. 2 and includes a processing module and a transceiving module. The transceiving module is configured to receive information from another apparatus and send information to another apparatus, including receiving the Attach Request message from the UE, receiving the Attach Accept message from the MME, receiving the Attach Complete message from the UE, sending the Attach Request message to the MME, sending the Attach Accept message to the UE, and sending the Attach Complete message to the MME.

The processing module is configured to determine a cell ID of a cell where the UE is located according to a measurement report of the UE and determine the location area information TAI of the UE according to the cell ID and the mapping between cell IDs and location areas in the destination network, and to send the TAI and the Attach Request message to the MME via the transceiving module.

Here, the processing module is further configured to make a handover decision according to information reported by the UE and local policies and instruct the UE to initiate a handover procedure via the transceiving module.

The MME in the above embodiment is shown in FIG. 2 and includes a processing module and a transceiving module.

The transceiving module is configured to receive information sent by another apparatus and send information to another apparatus, including receiving the Attach Request message and Attach Complete message sent by the UE and sending the Attach Accept message to the UE.

The processing module is configured to construct an Attach Accept message according to the Attach Request message; construct the destination network location area information TAI list and Periodic TA Update Timer required by the UE according to the TAI received together with the Attach Request message and send the parameters to the UE together with the Attach Accept message via the transceiving module; and perform general operations like information exchange with the core network according to the Attach Complete message to hand over the radio link of the UE to the destination network.

The system in the above embodiment is shown in FIG. 3 and includes at least a UE, an MME, and an HRPD AN. The UE is configured to make a handover decision according to collected information; construct an Attach Request message according to the handover decision and send the Attach Request message to the MME via the HRPD AN; and receive an Attach Accept message from the MME, construct an Attach Complete message according to the Attach Accept message and send the Attach Complete message to the MME.

The MME is configured to receive the Attach Request message from the UE; construct an Attach Accept message according to the Attach Request message and send the Attach Accept message to the UE; construct a TAI list and a Periodic TA Update Timer according to the TAI received together with the Attach Request message and send the parameters to the UE together with the Attach Accept message; and receive the Attach Complete message from the UE and perform general operations like information exchange with the core network according to the Attach Complete message to hand over the radio link of the UE to the destination network.

The HRPD AN is configured to make a handover decision according to information reported by the UE and local policies and instruct the UE to initiate a handover procedure; transmit messages transparently between the MME and the UE, including transmitting the Attach Request message and Attach Complete message from the UE to the MME and transmitting the Attach Accept message from the MME to the UE transparently; and determine the TAI in the destination network and send the TAI together with the Attach Request message to the MME.

The HRPD AN is further configured to determine the destination cell ID of the UE according to a measurement report of the UE and determine the TAI according to the destination cell ID and the mapping between cell IDs and location areas in the destination network.

In all the foregoing embodiments, the source network is a non-3GPP network and the destination network is a 3GPP network. The methods, apparatuses and systems in the embodiments of the present invention are also applicable to handover from a 3GPP network to a non-3GPP network. The implementation of the methods, apparatuses and systems for obtaining location area information in handover from a 3GPP network to a non-3GPP network is similar to the foregoing embodiments and thus not described here.

Although the technical solution of the present invention has been described through several exemplary embodiments, the invention is not limited to such embodiments. It is apparent that those skilled in the art can make various modifications and variations to the invention without departing from the spirit and scope of the present invention. The invention is intended to cover the modifications and variations provided that they fall in the scope of protection defined by the claims or their equivalents.

What is claimed is:

1. A mobility management entity of a source network, comprising:
   a receiver configured to receive a attach request from a User Equipment (UE) to initiate a handover;
   a processor configured to obtain a Tracking Area Identity (TAI) of the UE in accordance with source cell ID of the UE and a mapping between a cell ID of a cell in the source network and a location area in the destination network; and
   a transmitter configured to send the TAI of the UE to a mobility management entity of a destination network.

2. The mobility management entity according to claim 1, wherein the transmitter is further configured to send a Direct Transfer message carrying the TAI to the mobility management entity of the UE in the destination network.

3. The mobility management entity according to claim 1, wherein the receiver is further configured to receive a TAI list from the mobility management entity of the destination network, the TAI list is constructed by the mobility management entity of the destination network in accordance with the TAI of the UE.

4. The mobility management entity according to claim 1, wherein the mobility management entity of the source network is a High Rate Packet Data Access Node (HRPD AN).

5. A User Equipment comprising:
   a transmitter configured to send a attach request to a mobility management entity of a destination network via a mobility management entity of a source network upon a handover decision,
   a receiver configured to receive a attach accept message carrying a Tracking Area Identity (TAI) list from the mobility management entity of the destination network via the mobility management entity of the source network,
   wherein the TAI list is constructed by the mobility management entity of the destination network in accordance with a TAI sent from the mobility management entity of the source network.

6. The User Equipment according to claim 5, wherein the TAI is determined by the mobility management entity of the source network in accordance with a source cell identifier (ID) of the User Equipment and a mapping between a cell ID of a cell in the source network and a location area in the destination network.

7. The User Equipment according to claim 5, wherein the transmitter is further configured to send a attach complete message to the mobility management entity of the destination network via the mobility management entity of the source network after the receiver receives the attach accept message.

8. A mobility management entity of a source network comprising:
   a receiver configured to receive a attach request from a User Equipment (UE) in the source network to initiate a handover;
   a processor configured to obtain a Tracking Area Identity (TAI) of the UE; and
   a transmitter configured to send the TAI of the UE to a mobility management entity of a destination network;
   wherein the receiver is further configured to receive a TAI list from the mobility management entity of the destination network, the TAI list being constructed by the mobility management entity of the destination network in accordance with the TAI.

9. The mobility management entity according to claim 8, wherein the transmitter is further configured to send a Direct Transfer message carrying the TAI to the mobility management entity of the UE in the destination network.

10. The mobility management entity according to claim 8, wherein the mobility management entity functioning as the source mobility management entity for the UE is a High Rate Packet Data Access Node (HRPD AN).

* * * * *